(12) United States Patent
Oh et al.

(10) Patent No.: US 10,390,016 B2
(45) Date of Patent: Aug. 20, 2019

(54) APPARATUS OF ENCODING AN IMAGE

(71) Applicant: INFOBRIDGE PTE. LTD., Singapore (SG)

(72) Inventors: Soo Mi Oh, Seongnam (KR); Moonock Yang, Singapore (SG)

(73) Assignee: INFOBRIDGE PTE. LTD., Singapore (SG)

( * ) Notice: Subject to any disclaimer, the term of this patent is extended or adjusted under 35 U.S.C. 154(b) by 0 days.

(21) Appl. No.: 16/242,532

(22) Filed: Jan. 8, 2019

(65) Prior Publication Data

US 2019/0141327 A1    May 9, 2019

Related U.S. Application Data

(63) Continuation of application No. 15/449,580, filed on Mar. 3, 2017, now Pat. No. 10,205,947, which is a
(Continued)

(30) Foreign Application Priority Data

Nov. 4, 2011 (KR) .................. 10-2011-0114608

(51) Int. Cl.
*H04N 19/124* (2014.01)
*H04N 19/18* (2014.01)
(Continued)

(52) U.S. Cl.
CPC .......... *H04N 19/124* (2014.11); *H04N 19/11* (2014.11); *H04N 19/119* (2014.11);
(Continued)

(58) Field of Classification Search
None
See application file for complete search history.

(56) References Cited

U.S. PATENT DOCUMENTS 6,532,306 B1   3/2003   Boon et al.
8,009,730 B2   8/2011   Zhu et al.
(Continued)

FOREIGN PATENT DOCUMENTS

CN   101529918 A   9/2009
CN   102006481 A   4/2011
(Continued)

OTHER PUBLICATIONS

Auyeung et al, "Intra Coding with Directional DCT and Directional DWT," JCTVC-B107, Joint Collaborative Team on Video Coding (JCT-VC) of ITU-T SG16 WP3 and ISO/IEC JTC1/SC29/WG11, 2nd Meeting: Geneva, CH, Jul. 21-28, 2010; pp. 1-28.
(Continued)

*Primary Examiner* — Peter D Le
(74) *Attorney, Agent, or Firm* — Birch, Stewart, Kolasch & Birch, LLP

(57) ABSTRACT

An apparatus for decoding an image can include an inverse scanning module generating a quantized block; an inverse quantization module generating a quantization parameter predictor, adding the quantization parameter predictor to a differential quantization parameter to generate a quantization parameter and inversely quantizing the quantized block using the quantization parameter; an inverse transform module inversely transforming the inversely quantized block to restore a residual block; an intra prediction module generating a prediction block; and an of generating a reconstructed block using the residual block and the prediction block, wherein when a size of a transform unit is equal to or smaller than 8×8, the inverse scan pattern is a horizontal scan for a vertical mode and a predetermined number of intra prediction modes having closest direction to the vertical mode, the inverse scan pattern is a vertical scan for a horizontal mode and the predetermined number of the intra
(Continued)

prediction modes having closest direction to the horizontal mode.

5 Claims, 7 Drawing Sheets

Related U.S. Application Data continuation of application No. 14/621,015, filed on Feb. 12, 2015, now Pat. No. 9,621,893, which is a continuation of application No. 14/349,627, filed as application No. PCT/CN2012/083991 on Nov. 2, 2012, now Pat. No. 8,989,258.

(51) Int. Cl.

| | | |
|---|---|---|
| *H04N 19/196* | (2014.01) | |
| *H04N 19/157* | (2014.01) | |
| *H04N 19/463* | (2014.01) | |
| *H04N 19/593* | (2014.01) | |
| *H04N 19/61* | (2014.01) | |
| *H04N 19/129* | (2014.01) | |
| *H04N 19/159* | (2014.01) | |
| *H04N 19/11* | (2014.01) | |
| *H04N 19/122* | (2014.01) | |
| *H04N 19/63* | (2014.01) | |
| *H04N 19/13* | (2014.01) | |
| *H04N 19/119* | (2014.01) | |
| *H04N 19/176* | (2014.01) | |

(52) U.S. Cl.
CPC ......... *H04N 19/122* (2014.11); *H04N 19/129* (2014.11); *H04N 19/13* (2014.11); *H04N 19/157* (2014.11); *H04N 19/159* (2014.11); *H04N 19/176* (2014.11); *H04N 19/18* (2014.11); *H04N 19/197* (2014.11); *H04N 19/198* (2014.11); *H04N 19/463* (2014.11); *H04N 19/593* (2014.11); *H04N 19/61* (2014.11); *H04N 19/63* (2014.11)

(56) References Cited

U.S. PATENT DOCUMENTS

| | | | |
|---|---|---|---|
| 8,204,114 | B2 | 6/2012 | Wang et al. |
| 8,711,935 | B2* | 4/2014 | Kim .................... H04N 19/176 375/240.03 |
| 2002/0012395 | A1 | 1/2002 | Song et al. |
| 2004/0013202 | A1 | 1/2004 | Lainema |
| 2009/0232210 | A1 | 9/2009 | Auyeung |
| 2009/0238271 | A1 | 9/2009 | Kim et al. |
| 2009/0310678 | A1 | 12/2009 | Tanaka |
| 2011/0146761 | A1 | 6/2011 | Yang et al. |
| 2011/0243229 | A1 | 10/2011 | Kim et al. |
| 2011/0249726 | A1* | 10/2011 | Nguyen ............... H04N 19/176 375/240.03 |
| 2011/0292994 | A1 | 12/2011 | Lim et al. |
| 2012/0082223 | A1 | 4/2012 | Karczewicz et al. |
| 2012/0082235 | A1 | 4/2012 | Lou et al. |
| 2012/0224777 | A1 | 9/2012 | Kim et al. |
| 2012/0230403 | A1 | 9/2012 | Liu et al. |
| 2012/0314766 | A1 | 12/2012 | Chien et al. |
| 2013/0266064 | A1 | 10/2013 | Zhang et al. |
| 2014/0050262 | A1* | 2/2014 | Sakurai ................ H04N 19/176 375/240.03 |

FOREIGN PATENT DOCUMENTS

| | | |
|---|---|---|
| CN | 102142471 A | 8/2011 |
| WO | WO 2008/130367 A1 | 10/2008 |
| WO | WO 2011/121843 A1 | 10/2011 |
| WO | WO 2013/037489 A1 | 3/2013 |
| WO | WO 2013/039676 A1 | 3/2013 |
| WO | WO 2013/051903 A1 | 4/2013 |

OTHER PUBLICATIONS

Bross et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, 6th Meeting: Torino, IT, Jul. 14-22, 2011, pp. 1-217 (Total 229 pages).

Chen, "BoG report on intra mode coding with fixed number Of MPM candidates," Joint Collaborative Team on Video Coding (JCT-VC) of ITU-T SG16 WP3 and ISO/IEC JTC1/SC29/WG11, Document: JCTVC-F765, 6th Meeting, Torino, Jul. 14-22, 2011, pp. 1-3.

Joel Sole et al., "CE11: Unified scans for the significance map and coefficient level coding in high efficiency", Joint Collaborative Team on Video Coding (JCT-VC) of ITU-T SG16 WP3 and ISO/IEC JTC1/SC29/WG11 6th Meeting, Jul. 14-22, 2011, pp. 2-10, JCTVC-F288.

Sato, "CE4: Result of Combination 2.3.g+2.3.e," JCTVC-F648, Joint Collaborative Team on Video Coding (JCT-VC) of ITU-T SG16 WP3 and ISO/IEC JTC1/SC29/WG11, 6th Meeting: Torino, IT, Jul. 14-22, 2011, pp. 1-4.

Toru Kumakura et al., "Fixing the number of mpm candidates", Joint Collaborative Team on Video Coding (JCT-VC) of ITU-T SG16 WP3 and ISO/IEC JTC1/SC29WG11 6th Meeting, Jul. 14-22, 2011, pp. 2-9, JCTVC-F340.

Toru Kumakura et al., "Intro prediction mode coding based on direction difference", Joint Collaborative Team on Video Coding (JCT-VC) of ITU-T SC19 WP3 and ISO/IEC JTC1/SC29/WG11 6th Meeting, Jul. 14-22, 2011, pp. 2-14, JCTVC-F339.

Tzu-Der Chuang et al., "Luma Intra Prediction Mode Coding", Joint Collaborative Team on Video Coding (JCT-VC) of ITU-T SC16 WP3 and ISO/IEC JTC1/SC29WG11 6th Meeting, Jul. 14-22, 2011, pp. 2-6, JCTVC-F062.

Wei-Jung Chien et al., "Parishing friendly intra mode coding", Joint Collaborative Team on VideoCoding(JCT-VC) of ITU-T SC16 WP3 and ISO/IEC JTC1/SC29/WG11 6th Meeting, Jul. 14-22, 2011, pp. 2-6, JCTVC-F459.

Yunfei Zheng et al., "Ce11: Mode Dependent Coefficient Scanning", Joint Collaborative Team on Video Coding (JCT-VC) of ITU-T SG16 'WP3 and ISO/IEC JTC1/SC29/WG11 4th Meeting, Jan. 20-28, 2011, pp. 2-6, JCTVC-D393.

Zhang et al., "Infra mode coding with fixed length binarization," Joint Collaborative Team on Video Coding (JCT-VC) of ITU-T SG16 WP3 and ISO/IEC JTC1/SC29/WG11, 8th Meeting, Document: JCTVC-H0435, WG11 No. m23311, San Jose, Nov. 21-30, 2011, 5 pages.

Zhang et al., "Method for deriving Chroma QP from Luma QP," JCTVC-F277, Joint Collaborative Team on Video Coding (JCT-VC) of ITU-T SG16 WP3 and ISO/IEC JTC1/SC29/WG11, 6th Meeting: Torino; IT, Jul. 14-22, 2011, pp. 1-6.

\* cited by examiner

Diagonal Scan

APPARATUS OF ENCODING AN IMAGE

CROSS-REFERENCE TO RELATED APPLICATIONS

This application is a Continuation of U.S. application Ser. No. 15/449,580 filed on Mar. 3, 2017, which is the Continuation of U.S. application Ser. No. 14/621,015 filed on Feb. 12, 2015 (now U.S. Pat. No. 9,621,893 issued on Apr. 11, 2017), which is a Continuation of U.S. application Ser. No. 14/349,627 filed on Apr. 3, 2014 (now U.S. Pat. No. 8,989,258 issued on Mar. 24, 2015), which is a National Stage of International Patent Application No. PCT/CN2012/083991 filed on Nov. 2, 2012, which claims priority to Korean Patent Application No. 10-2011-0114608 filed in Republic of Korea on Nov. 4, 2011. The entire contents of all of the above applications are hereby incorporated by reference into the present application.

BACKGROUND OF THE INVENTION

Field of the Disclosure

The present invention relates to a method and an apparatus of decoding an image, and more particularly, to a method and apparatus of generating a quantized block by adaptively determining an inverse scan pattern based on an intra prediction mode and a size of a transform unit.

Description of the Related Art

In H.264/MPEG-4 AVC, one picture is divided into macroblocks to encode an image, the respective macroblocks are encoded by generating a prediction block using inter prediction or intra prediction. The difference between an original block and the prediction block is transformed to generate a transformed block, and the transformed block is quantized using a quantization parameter and one of a plurality of predetermined quantization matrices. The quantized coefficient of the quantized block are scanned by a predetermined scan type and then entropy-coded. The quantization parameter is adjusted per macroblock and encoded using a previous quantization parameter.

Meanwhile, techniques using various sizes of coding unit and transform unit are introduced to improve the coding efficacy. Techniques increasing a number of intra prediction modes are also introduces to generate a prediction block more similar to an original block.

But, the various sizes of coding unit and transform unit results in increase of coding bits of residual block when scanning a large transformed block. Also, the increase of the number of intra prediction modes requires more effective scanning method to reduce the coding bits of residual block.

SUMMARY OF THE INVENTION

The present invention is directed to a method of deriving an intra prediction mode of a prediction unit, selecting an inverse scan pattern of a current transform unit based on the intra prediction mode and a size of the transform unit, and generating the quantized block by inversely scanning significant flags, coefficients signs and coefficient levels according to the selected inverse scan pattern.

One aspect of the present invention provides a method of generating a quantized block, comprising: deriving an intra prediction mode of a prediction unit, selecting an inverse scan pattern of a current transform unit among a diagonal scan, a vertical scan and a horizontal scan based on the intra prediction mode and a size of the transform unit, and generating the quantized block by inversely scanning significant flags, coefficients signs and coefficient levels according to the selected inverse scan pattern.

A method according to the present invention derives an intra prediction mode of a prediction unit, selects an inverse scan pattern of a current transform unit among a diagonal scan, a vertical scan and a horizontal scan based on the intra prediction mode and a size of the transform unit, and generates a quantized block by inversely scanning significant flags, coefficients signs and coefficient levels according to the selected inverse scan pattern. If the transform unit is larger than a predetermined size, multiple subsets are generated and inversely scanned. Therefore, the amount of coding bits of the residual block is reduced by determining the scan pattern based on the size of the transform unit and the intra prediction mode, and by applying the scan pattern to each subset.

DETAILED DESCRIPTION OF THE EMBODIMENTS

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible, and it is to be understood that within the scope of the disclosed concept, the present invention may be practiced otherwise than as has been specifically described.

Figure 1:
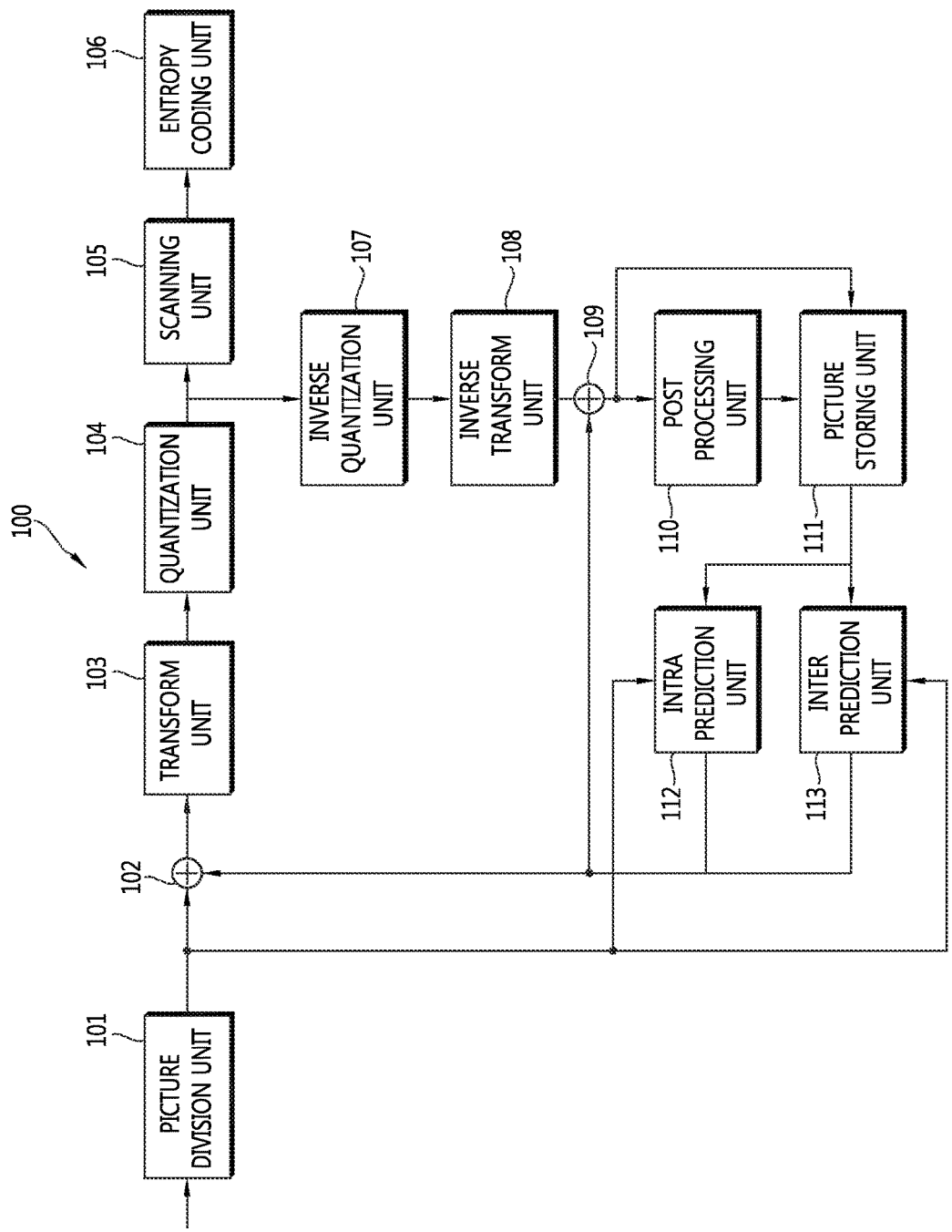
FIG. 1 is a block diagram of an image coding apparatus according to the present invention.

FIG. 1 is a block diagram of an image coding apparatus 100 according to the present invention.

Referring to FIG. 1, the image coding apparatus 100 according to the present invention includes a picture division unit 101, a transform unit 103, a quantization unit 104, a scanning unit 105, an entropy coding unit 106, an inverse quantization unit 107, an inverse transform unit 108, a post-processing unit 110, a picture storing unit 111, an intra prediction unit 112, an inter prediction unit 113, a subtracter 102 and an adder 109.

The picture division unit 101 divides a picture or a slice into a plurality of largest coding units (LCUs), and divides each LCU into one or more coding units. The picture division unit 101 determines prediction mode of each coding unit and a size of prediction unit and a size of transform unit.

An LCU includes one or more coding units. The LCU has a recursive quad tree structure to specify a division structure.

Information specifying the maximum size and the minimum size of the coding unit is included in a sequence parameter set. The division structure is specified by one or more split coding unit flags (split_cu_flags). The coding unit has a size of 2N×2N.

A coding unit includes one or more prediction units. In intra prediction, the size of the prediction unit is 2N×2N or N×N. In inter prediction, the size of the prediction unit is 2N×2N, 2N×N, N×2N or N×N. When the prediction unit is an asymmetric partition in inter prediction, the size of the prediction unit may also be one of hN×2N, (2−h)N×2N, 2N×hN and 2N×(2−h)N. The value of h is ½.

A coding unit includes one or more transform units. The transform unit has a recursive quad tree structure to specify a division structure. The division structure is specified by one or more split transform unit flags (split_tu_flags). Information specifying the maximum size and the minimum size of the transform unit is included in a sequence parameter set.

The intra prediction unit 112 determines an intra prediction mode of a current prediction unit and generates one or more prediction blocks using the intra prediction mode. The prediction block has the same size of the transform unit.

Figure 2:
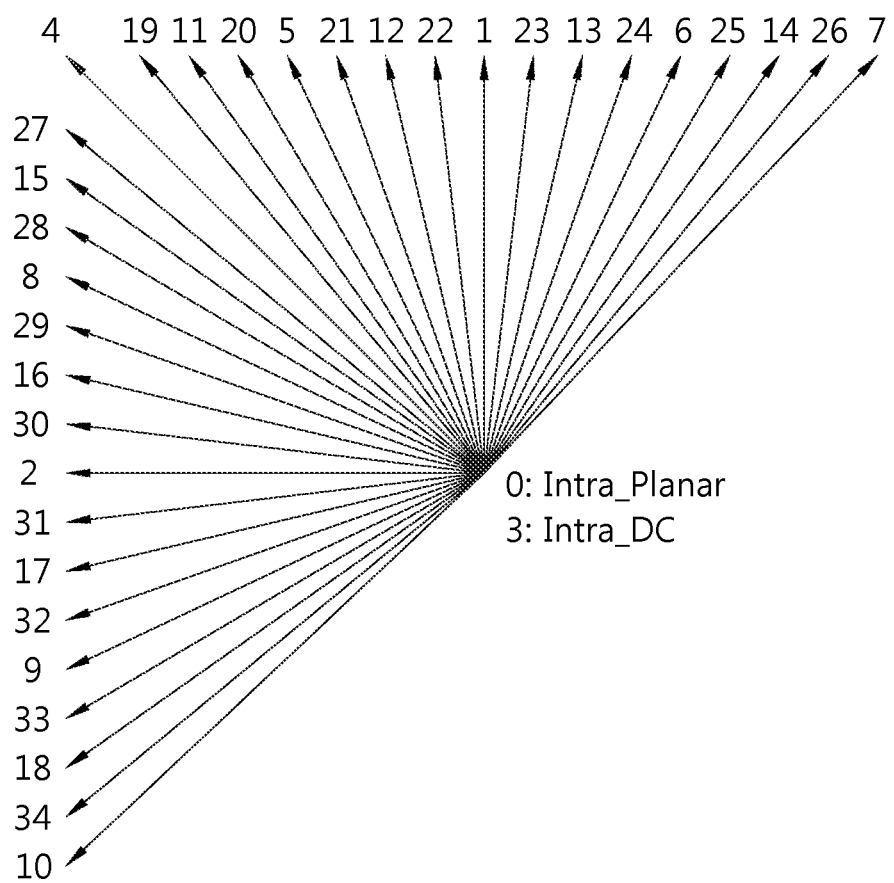
FIG. 2 is a conceptual diagram illustrating intra prediction modes according to the present invention.

FIG. 2 is a conceptual diagram illustrating intra prediction modes according to the present invention. As shown in FIG. 2, the number of intra prediction modes is 35. The DC mode and the planar mode are non-directional intra prediction modes and the others are directional intra prediction modes.

The inter prediction unit 113 determines motion information of the current prediction unit using one or more reference pictures stored in the picture storing unit 111, and generates a prediction block of the prediction unit. The motion information includes one or more reference picture indexes and one or more motion vectors.

The transform unit 103 transforms residual signals generated using an original block and a prediction block to generate a transformed block. The residual signals are transformed by the transform unit. A transform type is determined by the prediction mode and the size of the transform unit. The transform type is a DCT-based integer transform or a DST-based integer transform.

The quantization unit 104 determines a quantization parameter for quantizing the transformed block. The quantization parameter is a quantization step size. The quantization parameter is determined per quantization unit. The size of the quantization unit is one of allowable sizes of coding unit. If a size of the coding unit is equal to or larger than a minimum size of the quantization unit, the coding unit is set as the quantization unit. A plurality of coding units may be included in a quantization unit. The minimum size of the quantization unit is determined per picture and one parameter is used for specifying the minimum size of the quantization unit. The parameter is included in a picture parameter set.

The quantization unit 104 generates a quantization parameter predictor and generates a differential quantization parameter by subtracting the quantization parameter predictor from the quantization parameter. The differential quantization parameter is encoded and transmitted to the decoder. If there are no residual signals to be transmitted within the coding unit, the differential quantization parameter of the coding unit may not be transmitted.

The quantization parameter predictor is generated by using quantization parameters of neighboring coding units and quantization parameter of previous coding unit as follows.

A left quantization parameter, an above quantization parameter and a previous quantization parameter are sequentially retrieved in this order. An average of the first two available quantization parameters retrieved in that order is set as the quantization parameter predictor when two or more quantization parameters are available, and when only one quantization parameter is available, the available quantization parameter is set as the quantization parameter predictor. That is, if the left and above quantization parameter are available, the average of the left and above quantization parameter is set as the quantization parameter predictor. If only one of the left and above quantization parameter is available, the average of the available quantization parameter and the previous quantization parameter is set as the quantization parameter predictor. If both of the left and above quantization parameter are unavailable, the previous quantization parameter is set as the quantization parameter predictor. The average is rounded off.

The differential quantization parameter is converted into an absolute value of the differential quantization parameter and a sign flag indicting the sign of the differential quantization parameter. The absolute value of the differential quantization parameter is binarized as truncated unary. Then, the absolute value and the sign flag are arithmetically coded. If the absolute value is zero, the sign flag does not exist.

The quantization unit 104 quantizes the transformed block using a quantization matrix and the quantization parameter. The quantized block is provided to the inverse quantization unit 107 and the scanning unit 105.

The scanning unit 105 determines a scan pattern and applies the scan pattern to the quantized block.

In intra prediction, the distribution of the quantized transform coefficients varies according to the intra prediction mode and the size of the transform unit. Thus, the scan pattern is determined by the intra prediction mode and the size of the transform unit. The size of the transform unit, the size of transformed block and the size of the quantized block are same.

Figure 3:
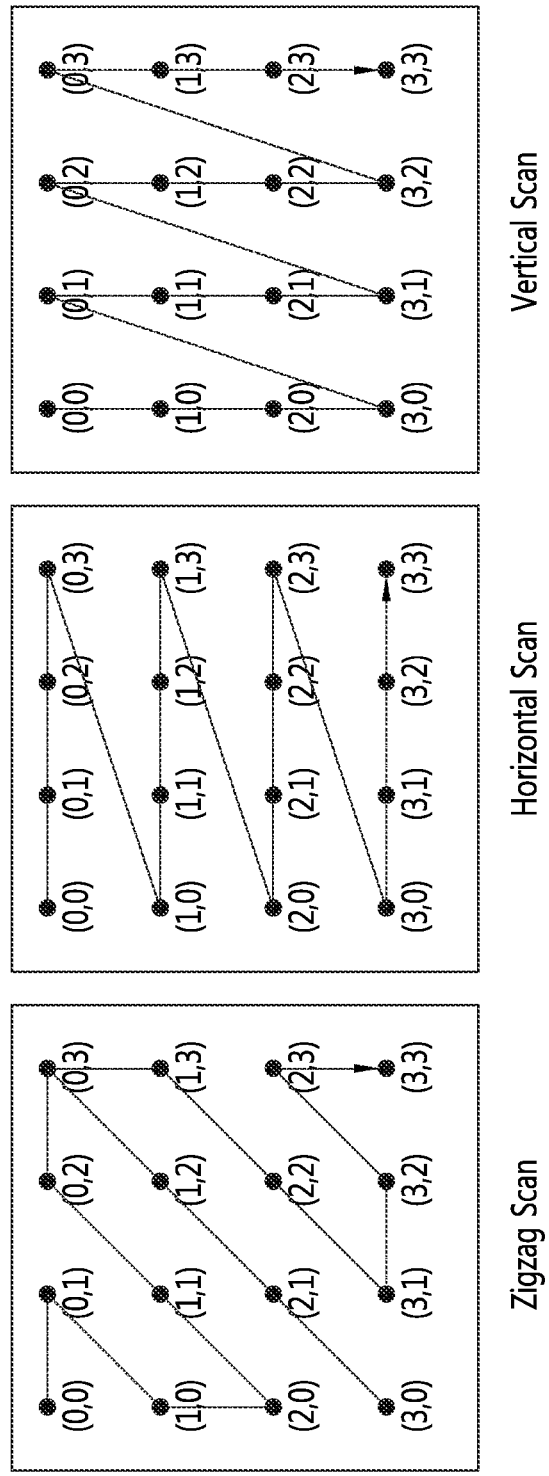
FIG. 3 is a conceptual diagram illustrating scan patterns according to the present invention.
Figure 4:
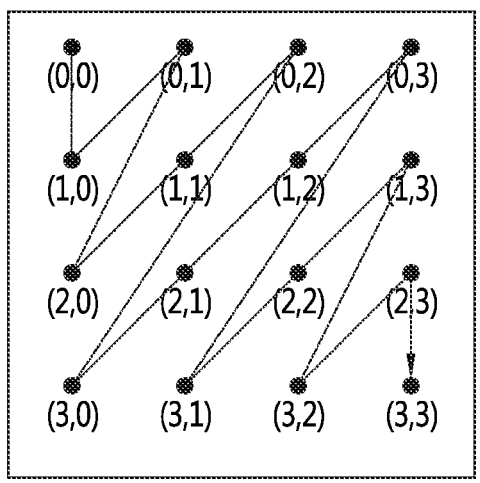
FIG. 4 is a conceptual diagram illustrating diagonal scan according the present invention.

FIG. 3 is a conceptual diagram illustrating scan patterns according to the present invention. FIG. 4 is a conceptual diagram illustrating a diagonal scan according the present invention. As shown in FIG. 3, the first scan pattern is a zigzag scan, the second scan pattern is a horizontal scan, and the third scan pattern is a vertical scan.

When CAVLC (Context adaptive variable length coding) is used for entropy coding, one scan pattern is selected among the zigzag scan, the horizontal scan and the vertical scan. But, when CABAC (Context adaptive binary arithmetic coding) is used for entropy coding, one scan pattern is selected among the diagonal scan, the horizontal scan and the vertical scan and the selected scan pattern is applied to the significant flags, coefficient signs and coefficient levels of the quantized block respectively. The significant flag indicates whether the corresponding quantized transform coefficient is zero or not. The coefficient sign indicates a sign of non-zero quantized transform coefficient, and the coefficients level indicates an absolute value of non-zero quantized transform coefficient.

Figure 5:
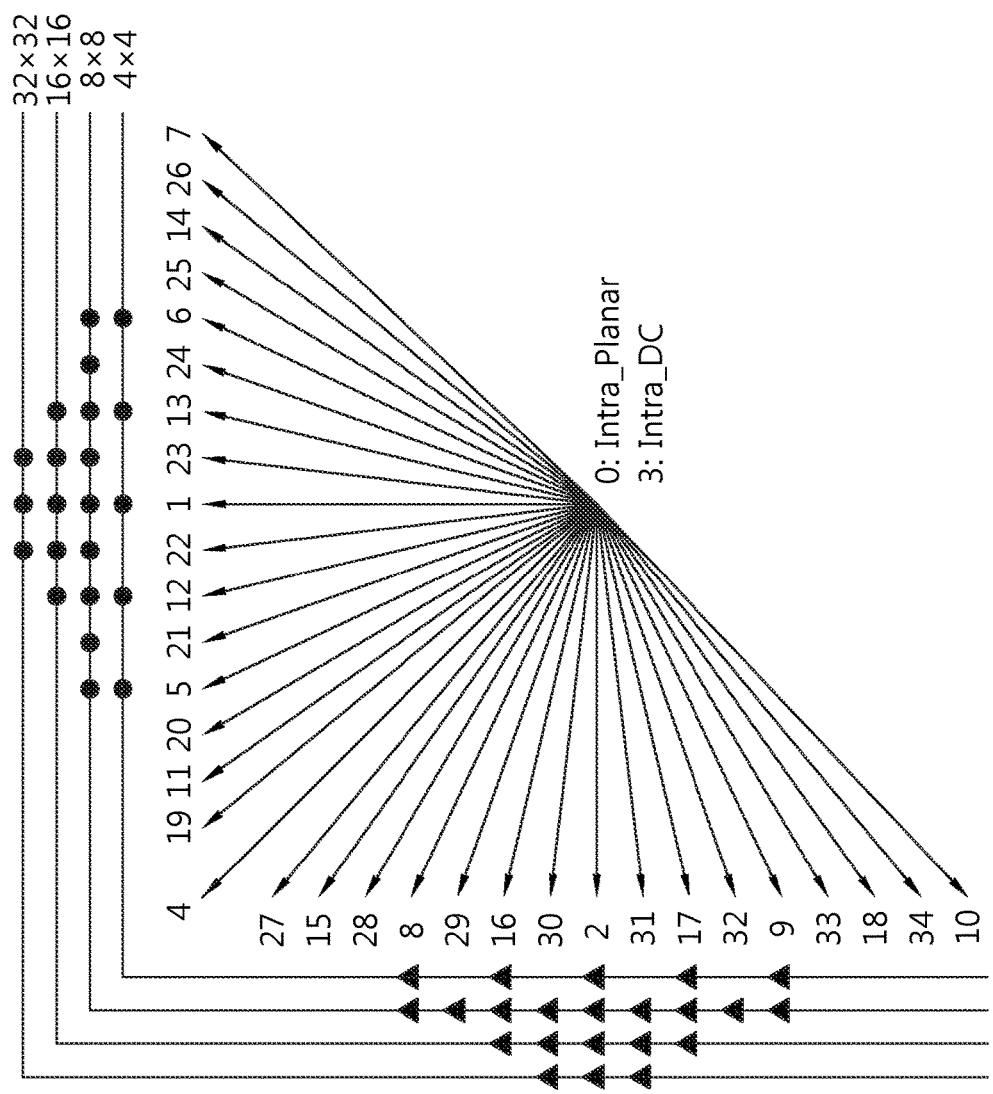
FIG. 5 is a conceptual diagram illustrating scan pattern determined by the intra prediction mode and the size of the transform unit according to the present invention.

FIG. 5 is a conceptual diagram illustrating exemplary scan pattern determined by the intra prediction mode and the size of the transform unit according to the present invention. When CABAC is used for entropy coding, the scan pattern is determined as follows.

When the size of the transform unit is 4×4, the horizontal scan is applied for the vertical mode (mode 1) and a first number of neighboring intra prediction modes of the vertical mode, the vertical scan is applied for the horizontal mode (mode 2) and the first number of neighboring intra prediction modes of the horizontal mode, and the diagonal scan is applied for all other intra prediction modes. That is, if it is supposed that the allowable intra prediction modes for 4×4 are modes 0 to 17, the horizontal scan is applied for mode 5, mode 6 and allowable modes between mode 5 and mode 6, and the vertical scan is applied for mode 8, mode 9 and allowable modes between mode 8 and 9. If the allowable intra prediction modes for 4×4 are modes 0 to 34, the applied scan pattern is the same of the following 8×8 transform unit.

When the size of the transform unit is 8×8, the horizontal scan is applied for the vertical mode (mode 1) and a second number of neighboring intra prediction modes of the vertical mode, the vertical scan is applied for the horizontal mode (mode 2) and the second number of neighboring intra prediction modes of the vertical mode, and the diagonal scan is applied for all other intra prediction modes. That is, the horizontal scan is applied for mode 5, mode 6 and allowable modes between mode 5 and mode 6, the vertical scan is applied for mode 8, mode 9 and allowable modes between mode 8 and 9, and the diagonal scan is applied for all other intra prediction modes. The allowable modes between mode 5 and mode 6 are modes 21, 12, 22, 1, 23, 13 and 24. The allowable modes between mode 8 and mode 9 are modes 29, 16, 30, 2, 31, 17, 32 and 9.

In inter prediction, a predetermined scan pattern is used regardless of the size of the transform unit. The predetermined scan pattern is the diagonal scan when the CABAC is used for entropy coding.

When the size of the transform unit is larger than a second size, the quantized block is divided into a main subset and a plurality of remaining subsets and the determined scan pattern is applied to each subset. Significant flags, coefficient signs and coefficients levels of each subset are scanned respectively according to the determined scan pattern. The quantized transform coefficients are split into significant flags, coefficient signs and coefficients levels.

The main subset includes DC coefficient and the remaining subsets covers the region other than the region covered by the main subset. The second size is 4×4. A size of the subset may be 4×4 block or a non-square block determined by the scan pattern. The non-square block includes 16 transform coefficients. For example, the size of the subset is 8×2 for the horizontal scan, 2×8 for the vertical scan and 4×4 for the diagonal scan.

The scan pattern for scanning the subsets is the same as the scan pattern for scanning quantized transform coefficients of each subset. The quantized transform coefficients of each subset are scanned in the reverse direction. The subsets are also scanned in the reverse direction.

Last non-zero coefficient position is encoded and transmitted to the decoder. The last non-zero coefficient position specifies a position of last non-zero quantized transform coefficient within the transform unit. The last non-zero coefficient position is used to determine the number of subsets to be signaled in the decoder. Non-zero subset flag is set for the each subset other than the main subset and the last subset. The last subset covers the last non-zero coefficient. The non-zero subset flag indicates whether the subset contains non-zero coefficients or not.

The inverse quantization unit 107 inversely quantizes the quantized transform coefficients of the quantized block.

The inverse transform unit 108 inversely transforms the inverse quantized block to generate residual signals of the spatial domain.

The adder 109 generates a reconstructed block by adding the residual block and the prediction block.

The post-processing unit 110 performs a deblocking filtering process for removing blocking artifact generated in a reconstructed picture.

The picture storing unit 111 receives post-processed image from the post-processing unit 110, and stores the image in picture units. A picture may be a frame or a field.

The entropy coding unit 106 entropy-codes the one-dimensional coefficient information received from the scanning unit 105, intra prediction information received from the intra prediction unit 112, motion information received from the inter prediction unit 113, and so on.

Figure 6:
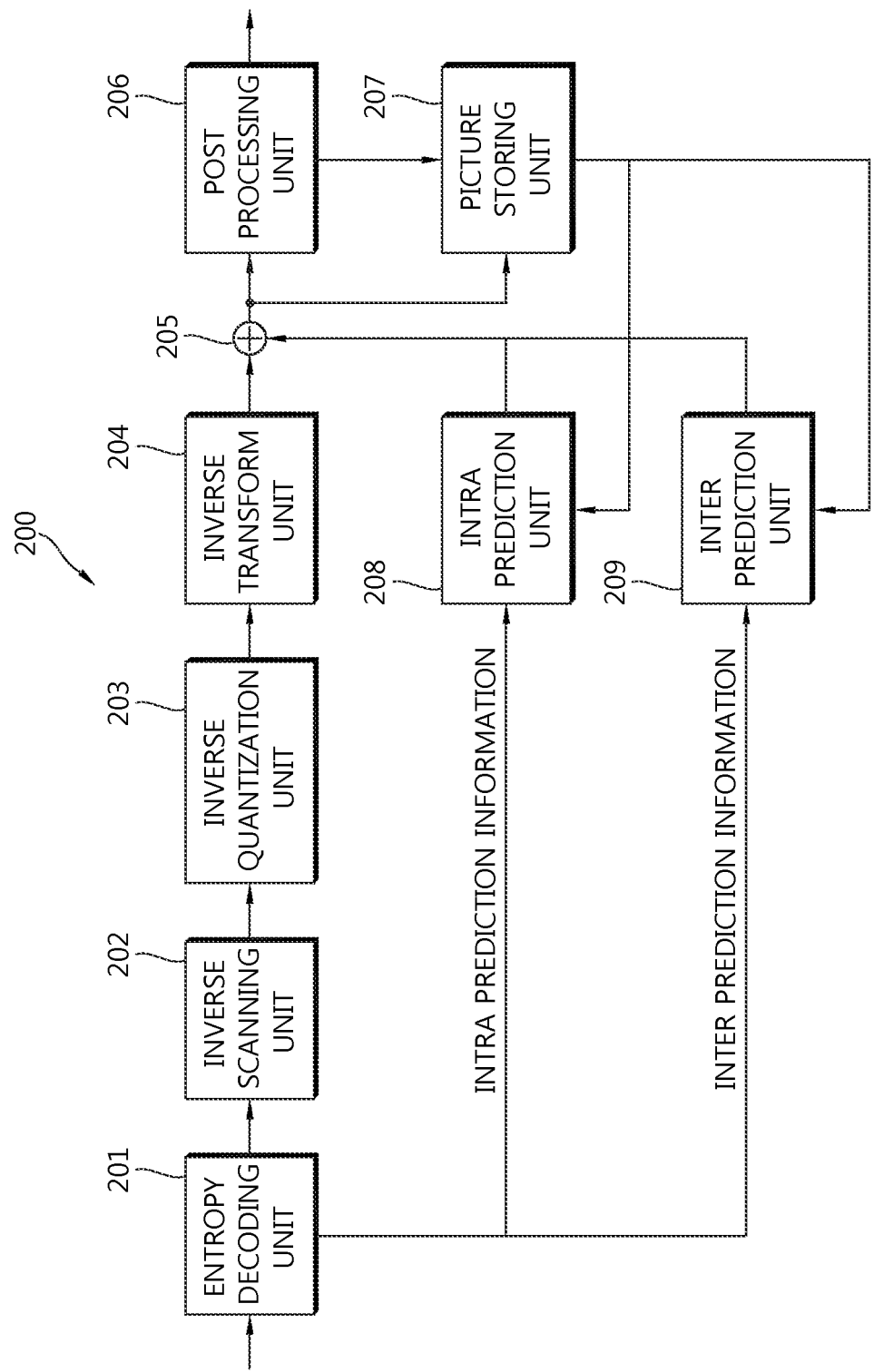
FIG. 6 is a block diagram of an image decoding apparatus 200 according to the present invention.

FIG. 6 is a block diagram of an image decoding apparatus 200 according to the present invention.

The image decoding apparatus 200 according to the present invention includes an entropy decoding unit 201, an inverse scanning unit 202, an inverse quantization unit 203, an inverse transform unit 204, an adder 205, a post processing unit 206, a picture storing unit 207, an intra prediction unit 208 and an inter prediction unit 209.

The entropy decoding unit 201 extracts the intra prediction information, the inter prediction information and the one-dimensional coefficient information from a received bit stream. The entropy decoding unit 201 transmits the inter prediction information to the inter prediction unit 209, the intra prediction information to the intra prediction unit 208 and the coefficient information to the inverse scanning unit 202.

The inverse scanning unit 202 uses an inverse scan pattern to generate a quantized block. When CABAC is used for entropy coding, the scan pattern is determined as follows.

The inverse scan pattern is selected among the diagonal scan, the vertical scan and the horizontal scan.

In intra prediction, the inverse scan pattern is determined by the intra prediction mode and the size of the transform unit. The inverse scan pattern is selected among a diagonal scan, vertical scan and horizontal scan. The selected inverse scan pattern is applied to significant flags, coefficient signs and coefficients levels respectively to generate the quantized block.

When the size of the transform unit is equal to or smaller than a first size, the horizontal scan is selected for the vertical mode and a predetermined number of neighboring intra prediction modes of the vertical mode, the vertical scan is selected for the horizontal mode and the predetermined number of neighboring intra prediction modes of the horizontal mode, and the diagonal scan is selected for the other intra prediction modes. When the size of the transform unit is larger than the first size, the diagonal scan is used. When the size of the transform unit is larger than the first size, the diagonal scan is selected for all intra prediction modes. The first size is 8×8.

When the size of the transform unit is 4×4, the horizontal scan is applied for the vertical mode (mode 1) and a first number of intra prediction modes having closest direction to the vertical mode, the vertical scan is applied for the horizontal mode (mode 2) and the first number of intra prediction modes having closest direction to the horizontal mode, and the diagonal scan is applied for all other intra prediction modes. That is, if it is supposed that the allowable intra prediction modes for 4×4 are modes 0 to 17, the horizontal scan is applied for mode 5, mode 6 and allowable modes between mode 5 and mode 6, and the vertical scan is applied for mode 8, mode 9 and allowable modes between mode 8 and 9. If the allowable intra prediction modes for 4×4 are modes 0 to 34, the applied scan pattern is the same of the following 8×8 transform unit.

When the size of the transform unit is 8×8, the horizontal scan is applied for the vertical mode (mode 1) and a second number of intra prediction modes having closest direction to the vertical mode, the vertical scan is applied for the horizontal mode (mode 2) and the second number of intra prediction modes having closest direction to the vertical mode, and the diagonal scan is applied for all other intra prediction modes. That is, the horizontal scan is applied for mode 5, mode 6 and allowable modes between mode 5 and mode 6, the vertical scan is applied for mode 8, mode 9 and allowable modes between mode 8 and 9, and the diagonal scan is applied for all other intra prediction modes. The allowable modes between mode 5 and mode 6 are modes 21, 12, 22, 1, 23, 13 and 24. The allowable modes between mode 8 and mode 9 are modes 29, 16, 30, 2, 31, 17, 32 and 9.

In inter prediction, the diagonal scan is used.

When the size of the transform unit is larger than the second size, the significant flags, the coefficient signs and the coefficients levels are inversely scanned in the unit of subset using the determined inverse scan pattern to generate subsets, and the subsets are inversely scanned to generate the quantized block. The second size is 4×4. The size of the subset may be 4×4 block or a non-square block determined by the scan pattern. The non-square block includes 16 transform coefficients. For example, the size of the subset is 8×2 for the horizontal scan, 2×8 for the vertical scan and 4×4 for the diagonal scan.

The inverse scan pattern used for generating each subset is the same as the inverse scan pattern used for generating the quantized block. The significant flags, the coefficient signs and the coefficient levels are inversely scanned in the reverse direction. The subsets are also inversely scanned in the reverse direction.

The last non-zero coefficient position and the non-zero subset flags are received from the encoder. The number of encoded subsets is determined according to the last non-zero coefficient position and the inverse scan pattern. The non-zero subset flags are used to select subsets to be generated. The main subset and the last subset are generated using the inverse scan pattern.

The inverse quantization unit 203 receives the differential quantization parameter from the entropy decoding unit 201 and generates the quantization parameter predictor. The quantization parameter predictor is generated through the same operation of the quantization unit 104 of FIG. 1. Then, the inverse quantization unit 203 adds the differential quantization parameter and the quantization parameter predictor to generate the quantization parameter of the current coding unit. If the size of the current coding unit is equal to or larger than the minimum size of the quantization unit and the differential quantization parameter for the current coding unit is not received from the encoder, the differential quantization parameter is set to 0.

The quantization parameter is generated per quantization unit. If the size of the coding unit is equal to or larger than the minimum size of the quantization unit, the quantization parameter is generated for the coding unit. If plural coding units are included in a quantization unit, the quantization parameter is generated for the first coding unit containing one or more non-zero coefficients in decoding order. The coding units after the first coding unit within the quantization unit have the same quantization parameter as that of the first coding unit.

The minimum size of the quantization unit is derived per picture using only one parameter included in the picture parameter set and the size of the largest coding unit.

The differential quantization parameter is restored per quantization unit. The encoded differential quantization parameter is arithmetically decoded to generate the absolute value of the differential quantization parameter and the sign flag indicting the sign of the differential quantization parameter. The absolute value of the differential quantization parameter is a bin string of truncated unary. Then, the differential quantization parameter is restored using the absolute value and the sign flag. If the absolute value is zero, the sign flag does not exist.

The inverse quantization unit 203 inversely quantizes the quantized block.

The inverse transform unit 204 inversely transforms the inversely quantized block to restore a residual block. The inverse transform type is adaptively determined according to the prediction mode and the size of the transform unit. The inverse transform type is the DCT-based integer transform or the DST-based integer transform.

The intra prediction unit 208 restores the intra prediction mode of the current prediction unit using the received intra prediction information, and generates a prediction block according to the restored intra prediction mode.

The inter prediction unit 209 restores the motion information of the current prediction unit using the received inter prediction information, and generates a prediction block using the motion information.

The post-processing unit 206 operates the same as the post-processing unit 110 of FIG. 1.

The picture storing unit 207 receives post-processed image from the post-processing unit 206, and stores the image in picture units. A picture may be a frame or a field.

The adder 205 adds the restored residual block and a prediction block to generate a reconstructed block.

Figure 7:
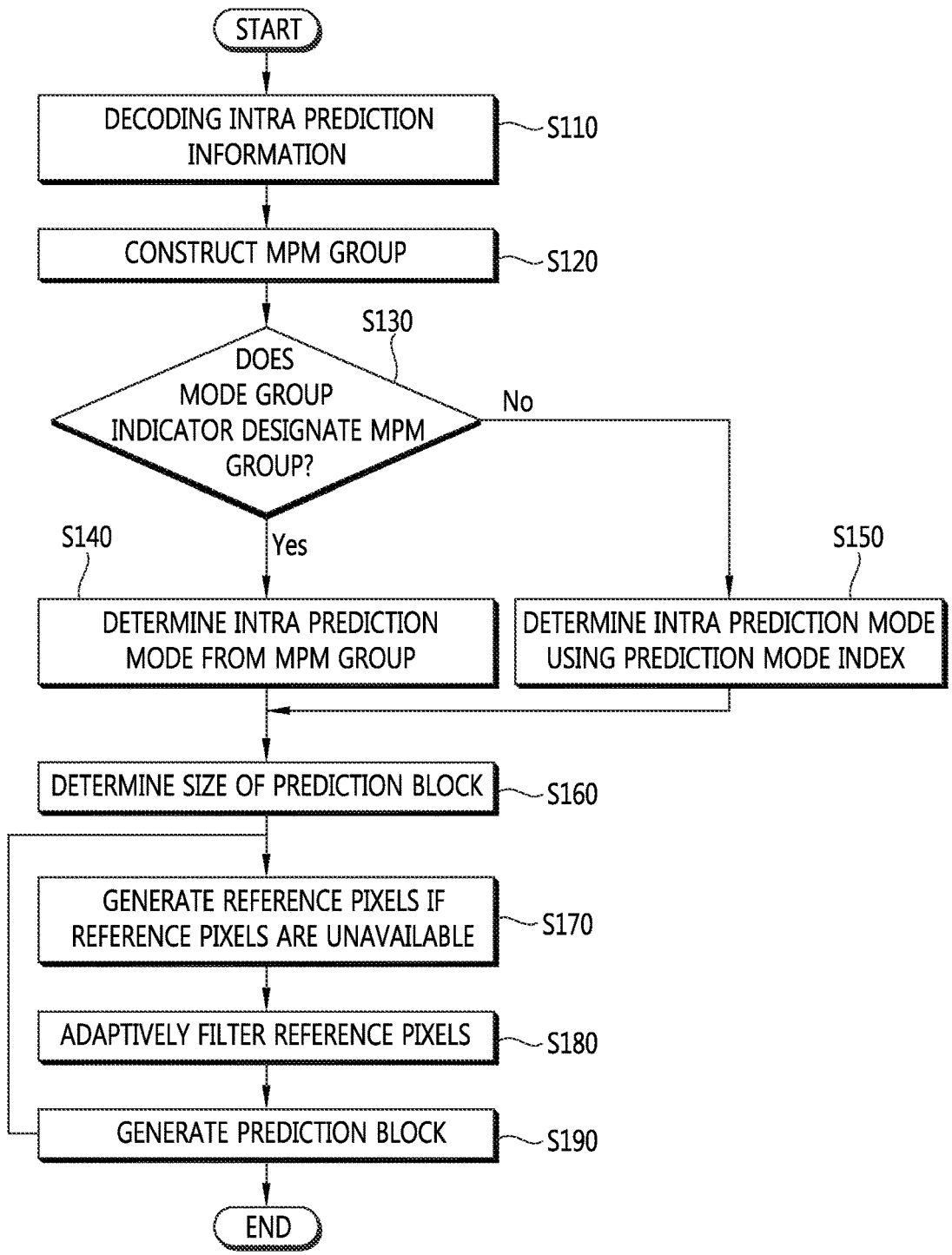
FIG. 7 is a flow chart illustrating a method of generating a prediction block according to the present invention.

FIG. 7 is a flow chart illustrating a method of generating a prediction block according to the present invention.

Intra prediction information of the current prediction unit is entropy-decoded (S110).

The intra prediction information includes a mode group indicator and a prediction mode index. The mode group indicator is a flag indicating whether the intra prediction mode of the current prediction unit belongs to a most probable mode group (MPM group). If the flag is 1, the intra prediction unit of the current prediction unit belongs to the MPM group. If the flag is 0, the intra prediction unit of the current prediction unit belongs to a residual mode group. The residual mode group includes all intra prediction modes other than the intra prediction modes belonging to the MPM group. The prediction mode index specifies the intra prediction mode of the current prediction unit within the group specified by the mode group indicator.

The MPM group is constructed using intra prediction modes of the neighboring prediction units (S120).

The intra prediction modes of the MPM group are adaptively determined by a left intra prediction mode and an above intra prediction mode. The left intra prediction mode is the intra prediction mode of the left neighboring prediction unit, and the above intra prediction mode is the intra prediction mode of the above neighboring prediction unit. The MPM group is comprised of three intra prediction modes.

If the left or above neighboring prediction unit does not exist, the intra prediction mode of the left or above neighboring unit is set as unavailable. For example, if the current prediction unit is located at the left or upper boundary of a picture, the left or above neighboring prediction unit does not exist. If the left or above neighboring unit is located within other slice or other tile, the intra prediction mode of the left or above neighboring unit is set as unavailable. If the left or above neighboring unit is inter-coded, the intra prediction mode of the left or above neighboring unit is set as unavailable. If the above neighboring unit is located within other LCU, the intra prediction mode of the left or above neighboring unit is set as unavailable.

When both of the left intra prediction mode and the above intra prediction mode are available and are different each other, the left intra prediction mode and the above intra prediction mode are included in the MPM group and one additional intra prediction mode is added to the MPM group. Index 0 is assigned to one intra prediction mode of small mode number and index 1 is assigned to the other. Or index 0 is assigned to the left intra prediction mode and index 1 is assigned to the above intra prediction mode. The added intra prediction mode is determined by the left and above intra prediction modes as follows.

If one of the left and above intra prediction modes is a non-directional mode and the other is a directional mode, the other non-directional mode is added to the MPM group. For example, if the one of the left and above intra prediction modes is the DC mode, the planar mode is added to the MPM group. If the one of the left and above intra prediction modes is the planar mode, the DC mode is added to the MPM group. If both of the left and above intra prediction modes are non-directional modes, the vertical mode is added to the MPM group. If both of the left and above intra prediction modes are directional modes, the DC mode or the planar mode is added to the MPM group.

When only one of the left intra prediction mode and the above intra prediction mode is available, the available intra prediction mode is included in the MPM group and two additional intra prediction modes are added to the MPM group. The added two intra prediction modes are determined by the available intra prediction modes as follows.

If the available intra prediction mode is a non-directional mode, the other non-directional mode and the vertical mode are added to the MPM group. For example, if the available intra prediction mode is the DC mode, the planar mode and the vertical mode are added to the MPM group. If the available intra prediction mode is the planar mode, the DC mode and the vertical mode are added to the MPM group. If the available intra prediction mode is a directional mode, two non-directional modes (DC mode and planar mode) are added to the MPM group.

When both of the left intra prediction mode and the above intra prediction mode are available and are the same each other, the available intra prediction mode is included in the MPM group and two additional intra prediction modes are added to the MPM group. The added two intra prediction modes are determined by the available intra prediction modes as follows.

If the available intra prediction mode is a directional mode, two neighboring directional modes are added to the MPM group. For example, if the available intra prediction mode is the mode 23, the left neighboring mode (mode 1) and the right neighboring mode (mode 13) are added to the MPM group. If the available intra prediction mode is the mode 30, the two neighboring modes (mode 2 and mode 16) are added to the MPM group. If the available intra prediction mode is a non-directional mode, the other non-directional mode and the vertical mode are added to the MPM group. For example, if the available intra prediction mode is the DC mode, the planar mode and the vertical mode are added to the MPM group.

When both of the left intra prediction mode and the above intra prediction mode are unavailable, three additional intra prediction modes are added to the MPM group. The three intra prediction modes are the DC mode, the planar mode and the vertical mode. Indexes 0, 1 and 2 are assigned to the three intra prediction modes in the order of the DC mode, the planar mode and the vertical mode or in the order of the planar mode, the DC mode and the vertical mode.

It is determined whether the mode group indicator designates the MPM group (S130).

If the mode group indicator indicates the MPM group, the intra prediction of the MPM group specified by the prediction mode index is set as the intra prediction mode of the current prediction unit (S140).

If the mode group indicator does not indicate the MPM group, the intra prediction is derived by comparing the prediction mode index and the intra prediction modes of the MPM group as the following ordered steps (S150).

1) Among the three intra prediction modes of the MPM group, the intra prediction mode with lowest mode number is set to a first candidate, the intra prediction mode with middle mode number is set to a second candidate, and the intra prediction mode with highest mode number is set to a third candidate.

2) The prediction mode index is compared with the first candidate. If the prediction mode index is equal to or greater than the first candidate of the MPM group, the value of the prediction mode index is increased by one. Otherwise, the value of the prediction mode index is maintained.

3) The prediction mode index is compared with the second candidate. If the prediction mode index is equal to or greater than the second candidate of the MPM group, the value of the prediction mode index is increased by one. Otherwise, the value of the prediction mode index is maintained.

4) The prediction mode index is compared with the third candidate. If the prediction mode index is equal to or greater than the third candidate of the MPM group, the value of the prediction mode index is increased by one. Otherwise, the value of the prediction mode index is maintained.

5) The value of the final prediction mode index is set as the mode number of the intra prediction mode of the current prediction unit.

A size of the prediction block is determined based on the transform size indicator specifying the size of the transform unit (S160). The transform size indicator may be a split transform flag specifying the size of the transform unit.

If the size of the transform unit is equal to the size of the current prediction unit, the prediction block is generated through the following steps S170~S190.

If the size of the transform unit is smaller than the size of the current prediction unit, a prediction block of the first sub-block of the current prediction unit is generated through the steps S170 to S190, a residual block of the first current sub-block is generated and a reconstructed block of the first sub-block is generated by adding the prediction block and the residual block. Then, a reconstructed block of the next sub-block in decoding order is generated. The same intra prediction mode is used for all the sub-block. The sub-block has the size of the transform unit.

It is determined whether all reference pixels of the current block are available, and reference pixels are generated if one or more reference pixels are unavailable (S170). The current block is the current prediction unit or the sub-block. The size of the current block is the size of the transform unit.

The reference pixels are adaptively filtered based on the intra prediction mode and the size of the current block (S180). The size of the current block is the size of the transform unit.

In the DC mode, the vertical mode and the horizontal mode, the reference pixels are not filtered. In the directional modes other than the vertical and horizontal modes, the reference pixels are adaptively according to the size of the current block.

If the size of the current block is 4×4, the reference pixels are not filtered in all intra prediction modes. For the size 8×8, 16×16 and 32×32, the number of intra prediction mode where the reference pixels are filtered increases as the size of the current block becomes larger. For example, the reference pixels are not filtered in the vertical mode and a predetermined number of neighboring intra prediction mode of the vertical mode. The reference pixels are also not filtered in the horizontal mode and the predetermined number of neighboring intra prediction mode of the horizontal mode. The predetermined number decreases as the size of the current block increases.

A prediction block of the current block is generated using the reference pixels and the intra prediction mode of the current prediction unit (S190).

In the vertical mode, the prediction pixels are generated by copying the value of the vertical reference pixel. The prediction pixels adjacent to the left reference pixel are filtered using the corner reference pixel and the left neighboring reference pixel.

In the horizontal mode, the prediction pixels are generated by copying the value of the horizontal reference pixel. The prediction pixels adjacent to the above reference pixel are filtered using the corner reference pixel and the above neighboring reference pixel.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for decoding an image, the method comprising:
    generating a quantized block based on an inverse scan pattern;
    generating a quantization parameter predictor, adding the quantization parameter predictor to a differential quantization parameter to generate a quantization parameter and inversely quantizing the quantized block using the quantization parameter;
    inversely transforming the inversely quantized block to restore a residual block;
    generating a prediction block;
    generating a reconstructed block using the residual block and the prediction block,
    wherein when a size of a transform unit is equal to or smaller than 8×8, the inverse scan pattern is a horizontal scan for a vertical mode and a predetermined number of intra prediction modes having closest direction to the vertical mode, the inverse scan pattern is a vertical scan for a horizontal mode and the predetermined number of the intra prediction modes having closest direction to the horizontal mode, and the inverse scan pattern is a diagonal scan for all other intra prediction modes, and
    when the size of the transform unit is larger than 4×4, the transform unit is divided into plural subsets and is inversely scanned in reverse direction according to the inverse scan pattern to generate plural subsets and the plural subsets are inversely scanned in reverse direction according to the inverse scan pattern to generate the quantized block;
    wherein the differential quantization parameter is restored per quantization unit by using an absolute value and a sign flag of the differential quantization parameter,
    if only one of a left quantization parameter of a current coding unit and an above quantization parameter of the current coding unit is available, an average of the available quantization parameter and a previous quantization parameter of the current coding unit is set as the quantization parameter predictor, and
    if both of the left quantization parameter and the above quantization parameter are unavailable, the previous quantization parameter is set as the quantization parameter predictor;
    wherein if plural coding units are included in the quantization unit, the quantization parameter is generated for the first coding unit containing one or more non-zero coefficients in decoding order, and
    wherein an inverse transform type for inversely transforming the inversely quantized block is selected among a DCT-based integer transform and a DST-based integer transform depending on a prediction mode and a size of a transform unit.

2. The method of claim 1, wherein an inverse transform type for inversely transforming the inversely quantized block is determined according to a prediction mode and the size of the transform unit.

3. The method s of claim 1, wherein the plural subsets are generated based on non-zero subset flags.

4. The method of claim 1, wherein the quantization parameter is generated per quantization unit, and a minimum size of the quantization unit is adjusted per picture.

5. The method of claim 1, wherein the size of a transform unit is equal to 8×8, and the predetermined number is 8.